United States Patent [19]
O'Leary

[11] 3,985,369
[45] Oct. 12, 1976

[54] PROTECTIVE COVER FOR AN ANTI-JACK KNIFE DEVICE

[75] Inventor: William O'Leary, Bishopstown, Ireland

[73] Assignee: Artiloc U.S.A. Inc., San Francisco, Calif.

[22] Filed: Mar. 27, 1975

[21] Appl. No.: 562,762

Related U.S. Application Data

[63] Continuation-in-part of Ser. No. 225,325, Feb. 10, 1972, Pat. No. 3,874,699.

[52] U.S. Cl. ............................................. 280/432
[51] Int. Cl.² ...................................... B62D 53/10
[58] Field of Search .......... 280/422, 423, 432, 433, 280/438 R, 438 A, 446 R, 446 B

[56] References Cited
UNITED STATES PATENTS

| | | | |
|---|---|---|---|
| 3,181,887 | 5/1965 | Boylan | 280/422 |
| 3,328,051 | 6/1967 | Hope | 280/432 |

Primary Examiner—M. H. Wood, Jr.
Assistant Examiner—R. Schrecengost
Attorney, Agent, or Firm—Edward F. Connors

[57] ABSTRACT

In an anti jack-knifing coupling arrangement between a tractor vehicle and a trailer wherein a turntable is mounted on the tractor vehicle for rotation about a vertical axis and carries a brake member for rotation therewith and having opposing horizontal parallel faces defining brake surfaces and brake callipers are mounted on the tractor vehicle for operative engagement with such brake surfaces, while themselves being restrained from movement about the vertical axis; the brake surfaces and the brake callipers are cooperatively disposed in a manner so as to be protected from exposure to rain and like elements and are kept clean and dry so that any possible slippage therebetween when the brake callipers are actuated to grip the brake surfaces is obviated.

10 Claims, 4 Drawing Figures

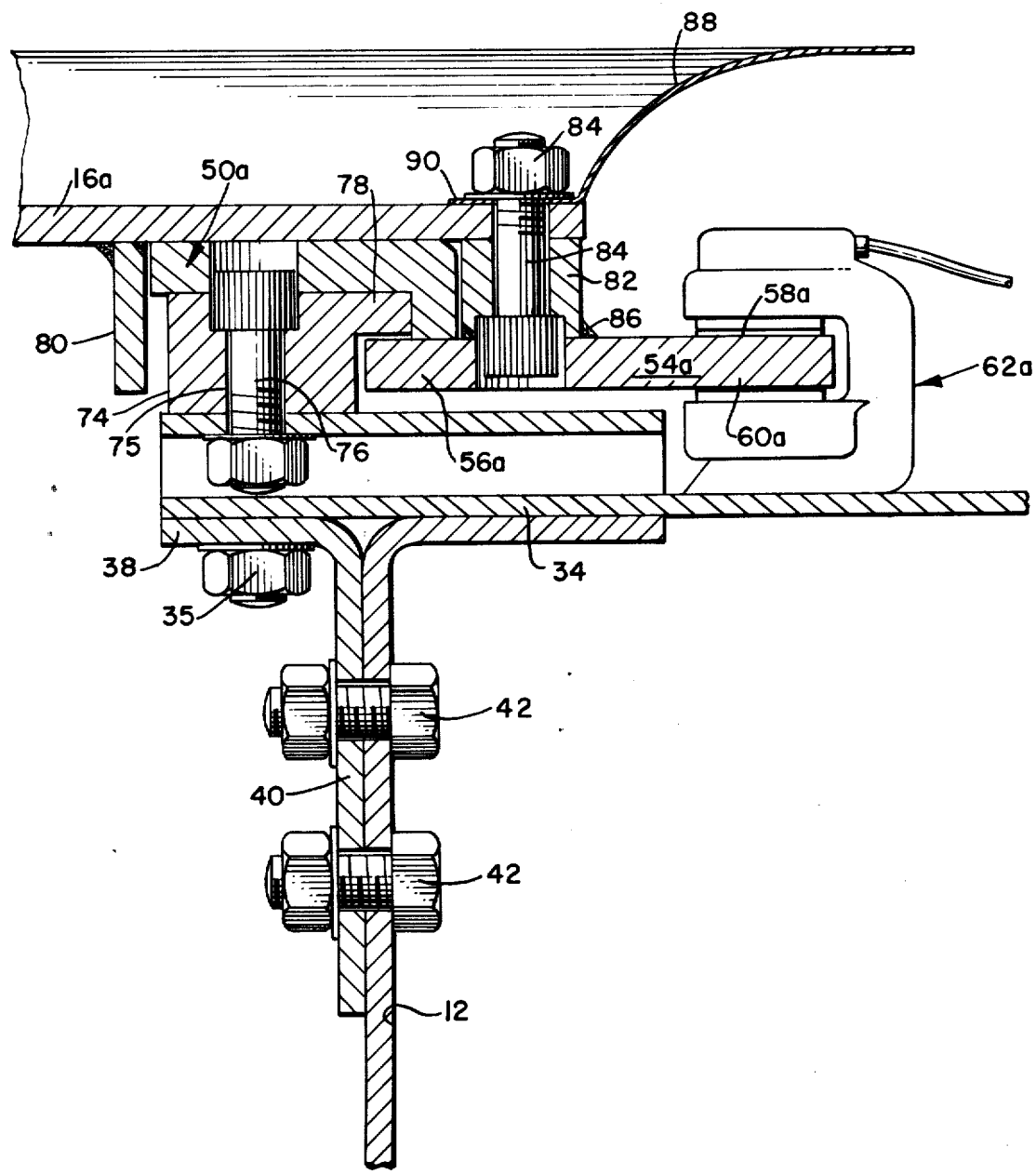

PROTECTIVE COVER FOR AN ANTI-JACK KNIFE DEVICE

This application is a continuation-in-part of application Ser. No. 225,325, filed Feb. 10, 1972 and now U.S. Pat. No. 3,874,699.

BACKGROUND OF THE INVENTION

1. Field Of The Invention

The present invention generally appertains to new and novel improvements in connections between tractor vehicles and trailers of any type or nature and especially relates to a new and novel coupling arrangement for preventing jack-knifing in such types of articulated vehicle assemblies.

2. State Of The Prior Art

In the operation of articulated vehicles, which essentially comprise a load-carrying trailer attached to a tractor vehicle by a fifth wheel coupling, a well recognized hazard is the tendency of the trailer to jack-knife during deceleration of the tractor vehicle or on slippery road surfaces. Jack-knifing usually occurs whenever the rear surface engaging wheels of the tractor vehicle becomes locked and skid in a direction normal to the direction of travel whereby the load carrying trailer swings about the fifth wheel coupling and tends to overtake the tractor vehicle.

In one type of jack-knifing condition, the front wheels of the trailer vehicle also lock and skid and the entire vehicle tends to skid in a straight line provided the tires of the trailer vehicle have similar frictional coefficients with the road surface. As the speed drops, any slight lack of balance between the frictional coefficients becomes more noticeable and the tractor vehicle starts to swing slowly but uncontrollably into a fully jack-knifed position.

In a second jack-knifing condition, the front wheels of the tractor vehicle do not skid and the slightest side force applied to such wheels will cause a sudden and most serious jack-knifing which is extremely difficult if not impossible to correct.

In the aforestated patent application, an anti jack-knifing device of a simple and most efficient structural and operational nature is disclosed.

Such device essentially comprises a turntable mounted on the tractor vehicle for rotation about a substantially vertical axis intersecting the longitudinal center line of the vehicle with a brake member carried by the turntable for rotation therewith and having opposing horizontal parallel faces defining brake surfaces. A fifth wheel coupling is secured to the turntable for rotation therewith and means is provided for connecting the trailer to the fifth wheel coupling so that the trailer is fast with the turntable for rotation therewith.

Brake callipers are mounted on the tractor vehicle so that they are restrained from movement about the aforestated vertical axis of rotation of the turntable. Such brake callipers are positioned for operational engagement with the brake surfaces at all articulated positions of the trailer relative to the tractor vehicle. The brake callipers are connected by suitable hoses to the fluid operated brake system of the trailer vehicle or can be connected to a dependent fluid system operated by a servo-cylinder actuated by the braking system of the trailer vehicle.

Whenever the wheel of the trailer vehicle are braked, the brake callipers will grip the brake surfaces and prevent articulation of the trailer relative to the tractor vehicle. The degree of braking torque applied to the brake surfaces by the brake callipers will depend upon the braking force applied to the wheels of the trailer vehicle so that the force applied by such brake callipers to prevent the trailer from jack-knifing will increase progressively with the deceleration of the entire articulated vehicle and with the transverse forces imposed on the trailer.

Such device has proven most effective in actual operation to inhibit or prevent jack-knifing. However, one point of improvement has been found to exist in protectively covering the brake member and the brake callipers so that they are not exposed to the rain and like elements.

Another point of improvement has been found to reside in lessening the overall weight of the device and simplifying the construction thereof, having regard to the mounting of the turntable on the tractor vehicle.

SUMMARY OF THE INVENTION

Accordingly, a primary object of the present invention is to provide a protective covering arrangement for the brake member and its attendant brake surfaces and the brake callipers so that they are not exposed to the rain and like elements and are kept clean and dry whereby any possible slippage therebetween when the brake callipers are actuated to grip the brake surfaces is prevented.

Another important object of the present invention is to provide a very simple, lightweight but most effective and efficient arrangement for rotatably mounting the turntable on the trailer vehicle.

Generally considered, the present invention essentially comprises a strengthened annular base plate which is anchored in a horizontal position by angle plates to the chassis of the tractor vehicle and on which a machined retaining ring is fixedly superimposed by suitable bolt means. A nylon bearing ring is fixedly seated on the retaining ring and a turntable plate is rotatably mounted on the bearing ring and carries a brake member. Means is provided in connection with the mounting of such turntable so that it is radially and horizontally supported for rotation and is held against axial movement relative to the supporting base plate.

The brake member is in the form of a disc that has opposing horizontal parallel faces that define the brake surfaces and which are adapted to be engaged by one or more brake callipers. The brake callipers are mounted on the tractor vehicle in a manner so that they are restrained from movement about the vertical axis of rotation of the turntable and for operative engagement with the brake surfaces at any articulated position of the trailer relative to the tractor vehicle.

In one embodiment of the present invention, an arcuate cover is affixed to the turntable in a manner so as to completely overlie and enclose the brake surfaces and the associated brake callipers. The cover has an outstanding substantially horizontal portion that is affixed to the circumferential edge portion of the turntable and an outer depending substantially vertical portion that extends down to a point near the mounted bottom of the base plate.

In another embodiment, the cover is of annular form and has an inner lateral flange that is fixed to the upper circumferential edge portion of the turntable with the cover extending upwardly and outwardly from the turntable assembly in a manner to overlie the brake member and the associated brake callipers.

In a still further embodiment, the brake member is attached to the turntable in a way so that it underlies the turntable and the brake callipers are mounted within the area of the turntable and disposed thereunder so as to be positioned for operative engagement with the brake surfaces of the brake member.

BRIEF DESCRIPTION OF THE DRAWINGS

FIG. 3 is an enlarged detailed sectional veiw showing another form of protective mounting arrangement.

DESCRIPTION OF THE PREFERRED EMBODIMENTS

Figure 2:
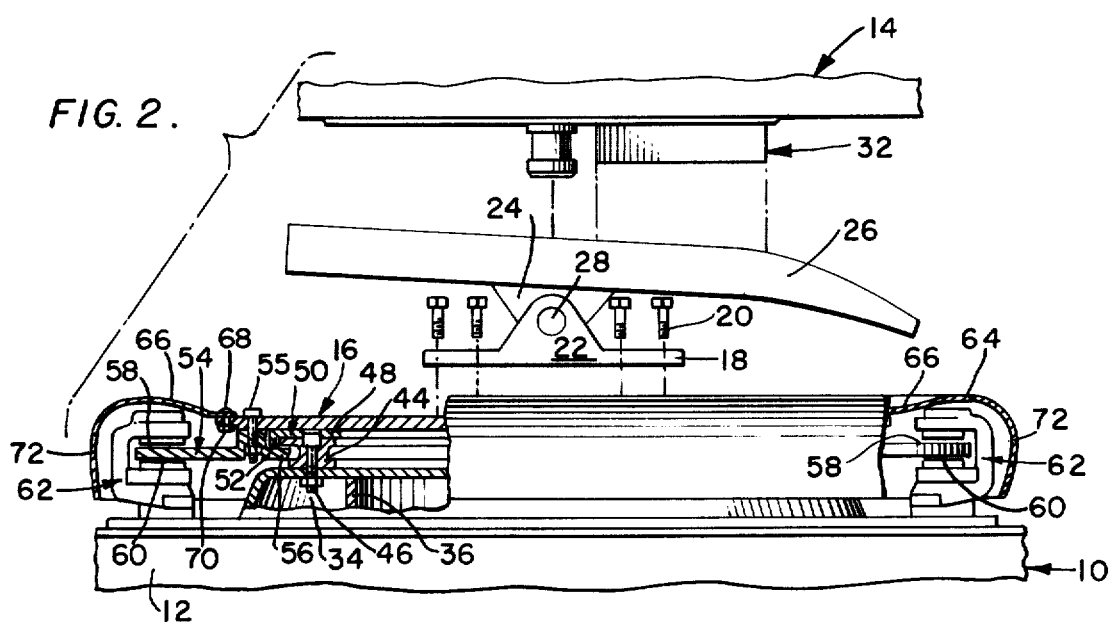
FIG. 2 is a longitudinal vertical sectional view of FIG. 1 and is taken substantially on lines 2—2 thereof and shows one form of protective mounting arrangement for the brake member and associated brake callipers.
Figure 1:
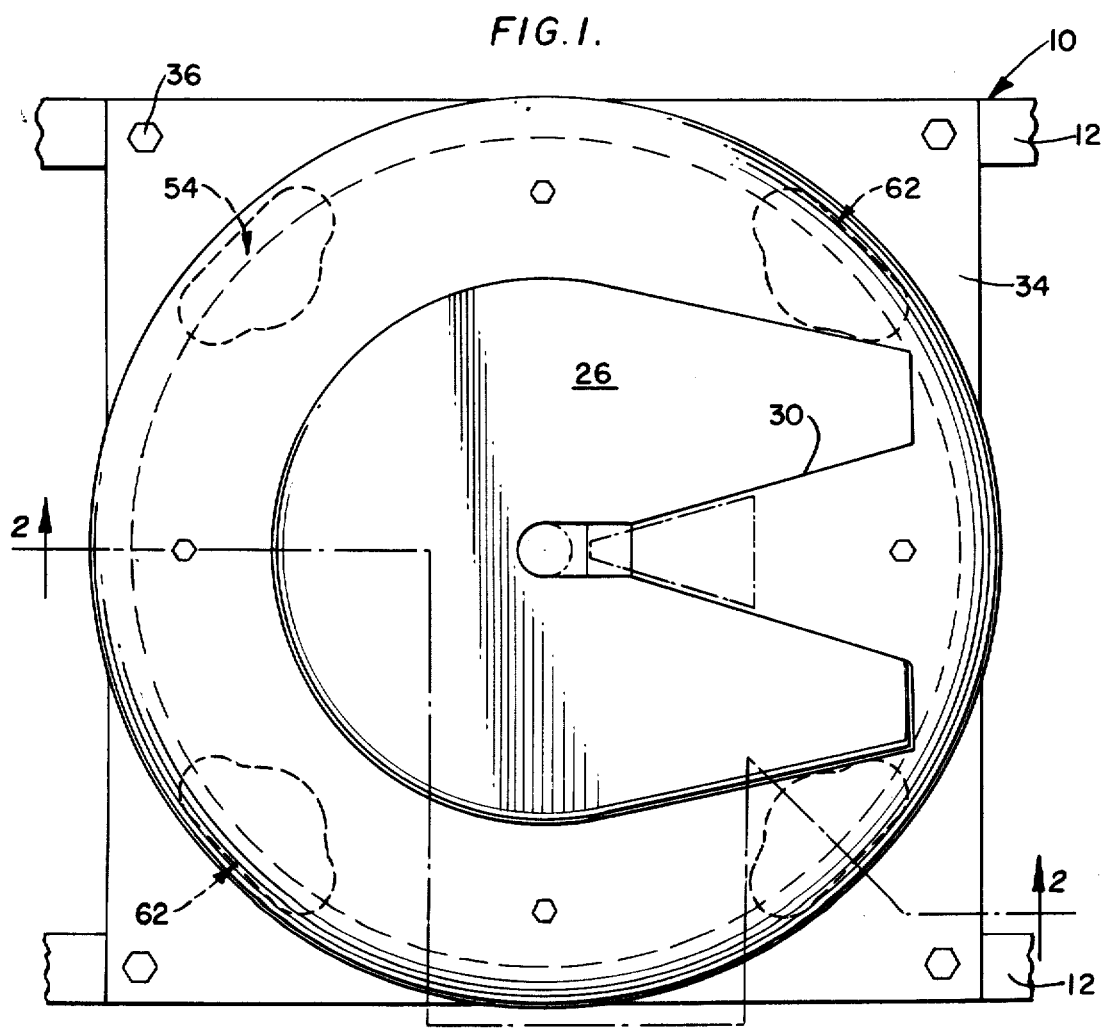
FIG. 1 is a top plane view of the coupling means of the present invention for connecting a tractor vehicle to an articulated trailer so as to prevent jack-knifing of the trailer.

Referring now more particularly to the accompanying drawings and initially to FIGS. 1 and 2, the reference numeral 10 generally designates a conventional tractor vehicle, which has longitudinal frame bars 12. A load carrying trailer, generally designated by reference numeral 14, is adapted to be connected to the tractor trailer.

The coupling means of the present invention includes a turntable 16, which is in the form of a flat plate that is rotatably mounted on the tractor vehicle, in a manner to be described, so that it is supported for rotation about a substantially vertical axis intersecting the longitudinal center line of the tractor vehicle. The turntable 16 is adapted to receive a pedestal 18, which is fastened thereon by bolts 20 and which is formed with spaced ears or lugs 22. The depending boss 24 of a fifth wheel 26 is adapted to be pivotally mounted between the ears by a horizontal pivot pin 28. The fifth wheel 26 is formed with a cut out portion 30 and is adapted to receive coupling means 32 carried by the underside of the front of the trailer 14, as generally shown in FIGS. 1 and 2. This is more specifically disclosed in the aforestated application.

Figure 4:
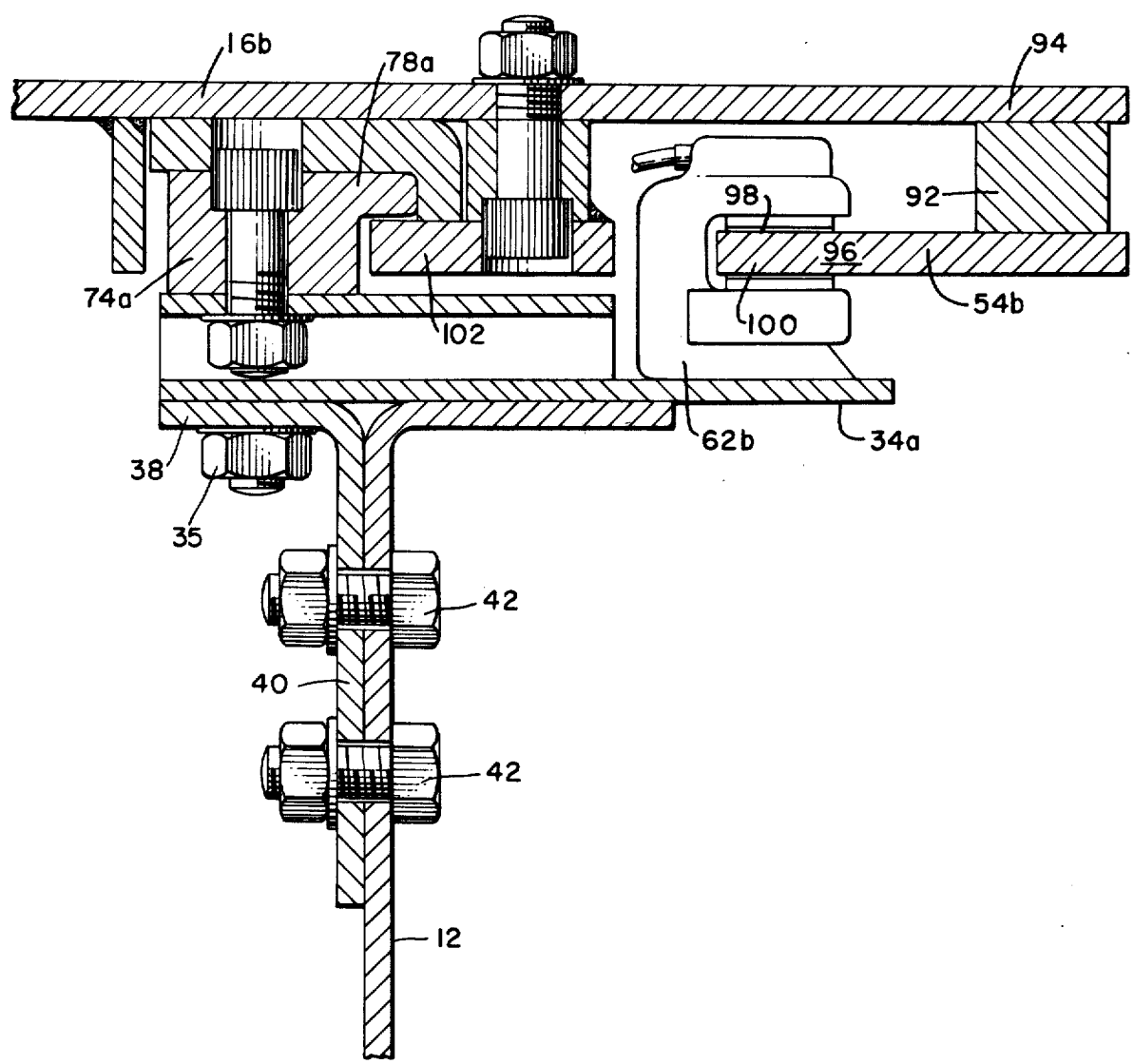
FIG. 4 is a sectional view similar to that of FIG. 3 and shows a further form of protective mounting arrangement.

The turntable is rotably mounted on a base or support plate 34 which may be corrugated or pressed and which is provided with a reinforcing rib 36. The base plate 34, as shown more particularly in FIGS. 3 and 4, is affixed by bolt means 35 to the horizontal legs 38 of angle plates 40 which are secured by bolt means 42 to the vertical sections of the frame bars 12.

As shown in FIG. 2, a machined retaining ring 44 is fastened by suitable bolt means 46, such as Allen cap screws, to the top of the annular base or support plate 34 with suitable openings being provided in such elements for the reception of the bolt means. The horizontal leg 48 of an L-shaped nylon bearing ring 50 is supported on the retaining ring and the vertical leg 52 thereof is disposed outwardly of the retaining ring. The horizontal and vertical portions of the bearing ring 50 radially and horizontally support the turntable 16 for free rotation about its vertical axis.

A brake member 54, which is in the form of an annular flat disc is fixed by bolt means 55 to the underside of the turntable. The brake disc has an inner edge portion 56 which cooperates with the retaining ring to prevent axial movement of the turntable relative to the support means that is constituted by the support plate 34. The outer edge portion of the brake member constitutes the brake and the opposing horizontal parallel faces 58 and 60 thereof define brake surfaces.

Brake callipers 62 are mounted on the base plate at spaced apart positions, preferably in front and rear pairs, as shown in FIG. 1. The brake callipers 62 are mounted on the support plate 34 to be restrained from movement about the vertical axis of the turntable and are positioned for operative engagement with the brake surfaces 58 and 60 at all articulated positions of the trailer relative to the tractor vehicle, as shown in FIG. 2, whereby upon actuation of the brake callipers articulation of the trailer relative to the tractor vehicle is resisted. The brake callipers are connected by suitable hose means (not shown) to the fluid operated brake system of the trailer vehicle or to an independent fluid system operated by a servo-cylinder actuated by the brake system of the tractor vehicle.

An annular cover 64, which is arcuate in cross-section, is provided and has a substantially horizontal portion 66 that terminates at its inner end in a mounting flange 68 which is fastened by bolt means 70 to the circumferential edge portion of the turntable radially outwardly of the bolt means 55. The horizontal section 66 extends beyond the brake callipers and the cover has a vertical depending section 72 which extends downwardly around the brake callipers in radially outwardly spaced relation thereto. The vertical section 72 extends downwardly to a point almost reaching the mounted base of the brake callipers and encompasses or encloses the brake callipers completely.

It can be appreciated that the cover 64 completely overlies and covers the brake surfaces and the brake callipers so as to prevent rain, snow and the like elements from coming into contact therewith. Thus, the cover keeps the brake surface and the associated brake callipers dry and clean whereby positive gripping action is ensured and any possible slippage between the brake callipers and the brake surfaces is completely obviated.

In the embodiment of FIG. 3, the retaining ring 74 is in the form of a block having a series of vertical apertures 75 for the reception of bolt means 76 whereby the ring is mounted on the support plate 34. The retaining ring has a radially inwardly extending lip 78 provided on its upper portion and the ring supports the L-shaped bearing ring 50a with a turntable 16a being mounted for rotation on the horizontal portion of the bearing ring. The turntable has a depending rib 80 which is disposed at the inner enf of the horizontal portion of the bearing ring and which radially supports the bearing ring platform. Also, a spacer sleeve 82 is affixed by bolt means 84 to the underside of the circumferential edge portion of the turntable and serves to radially support the turntable in connection with the vertically dependent portion of the bearing ring, as can be appreciated from a consideration of FIG. 3.

The brake member 54a, which is in the form of a disc plate, is welded as at 86 to the underside of the spacers 82 and the inner edge portion 56a defines a lip that underlies the lip 78 so that the lips are in overlapping relation whereby axial movement of the turntable relative to the support plate 34 is prevented. The brake callipers 62a are mounted on the support plate and engage the brake surfaces 58a and 60a of the brake member in the same manner as in the form of FIG. 2.

An arcuate cover 88 is provided at its inner end with a lateral mounting flange 90 and is affixed by the bolt means 84 to the top of the circumferential edge portion of the turntable 16a. The cover extends outwardly and upwardly from the circumferential edge portion of the turntable in a manner so as to overlie the brake callipers and the brake surfaces, as shown in FIG. 3.

The structural mounting of the turntable 16b in the embodiment of FIG. 4 is the same as that disclosed in connection with the turntable 16a of FIG. 3. However, in the embodiment of FIG. 4, the brake member 54b is attached by vertical spacer members 92 to the underside of the circumferential edge portion 94 of the turntable 16b and is positioned therebelow in vertically spaced relation therewith. The inner edge portion 96 of the brake member constitutes the brake means and has opposing parallel horizontal faces 98 and 100 which define the brake surfaces. The brake surfaces, as can be appreciated from FIG. 4, underlie the turntable and are completely protected thereby in vertically spaced relation therewith. The brake callipers 62b are mounted on the support member 34a so that they are inboard of the brake member and are restrained from moving about the vertical axis of the turntable and are positioned for operative engagement with the brake surfaces 98 and 100 at all articulated positions of the trailer relative to the tractor vehicle. The underlying positioning of the brake surfaces below the turntable ensures that the brake surfaces and brake callipers will be fully and completely protected from the elements. Thus, the turntable itself constitutes a cover means for the brake surfaces and the brake callipers.

In the form of FIG. 4, a retaining member 102 is welded to the spacer 82a and is adapted to cooperate with the overhanging lip 78a on the retaining ring 74a, in lieu of the inner edge portion of the brake member, as shown in the form of FIG. 3.

Having regard to any of the embodiments of the invention, it can be appreciated that the brake surfaces and attendant brake callipers are protectively covered and housed in such a way so that they are not exposed to inclement elements, such as rain, snow and the like. And so that they are kept clean and dry whereby any possible slippage therebetween when the brake callipers are actuated to grip the brakes surfaces is prevented.

Furthermore, having regard to the embodiments of FIGS. 1 and 2 or 3 and 4, it can be appreciated that a very simple, compact yet sturdy and efficient structural mounting arrangement is provided for the turntable which supports the fifth wheel. Such mounting arrangement lessens the weight of the assembly yet ensures the effectiveness and efficiency thereof.

While the preferred embodiments of the present invention have been described herein and shown in the accompanying drawings, it is to be understood that such is merely exemplary and that the invention is only to be limited by the spirit and scope of the appended claims.

What is claimed is:

1. A coupling means for connecting a tractor vehicle to an articulated trailer so as to prevent jack-knifing of the trailer comprising, a. support means secured to the rear of the tractor vehicle;
b. a bearing support carried by the support means;
c. bearing means mounted on the bearing support;
d. a turntable supported by the support means for rotation about a substantially vertical axis intersecting the longitudinal center line of the vehicle and rotatably mounted on the bearing means and supported thereby for rotation;
e. a brake member carried by the turntable for rotation therewith and having opposing horizontal parallel faces defining brake surfaces;
f. at least one brake calliper mounted on the tractor vehicle to be restrained from movement about said vertical axis and positioned for operative engagement with said brake surfaces at all articulated positions of the trailer relative to the tractor vehicle whereby upon actuation of the brake calliper articulation of the trailer relative to the tractor vehicle is resisted;
g. means operatively carried by the support means and the turntable for preventing axial movement of the turntable relative to the support means;
h. a fifth wheel coupling secured to the turntable for rotation therewith;
i. means for connecting the trailer to the fifth wheel coupling so that the trailer is fast with the turntable for rotation therewith;
j. a transverse horizontal pivot means operatively connected between the turntable and the fifth wheel coupling to permit the trailer to rise and fall relatively to the tractor vehicle when passing over a surface of varying grade; and,
k. means for protectively covering the brake member and the brake calliper so that they are not exposed to rain and the like elements and are kept clean and dry whereby any possible slippage therebetween when the brake calliper is actuated to grip the brake surfaces is prevented.

2. The invention of claim 1 wherein said last named means includes a cover member carried by the turntable in a manner to overlie the brake surfaces and the brake calliper.

3. The invention of claim 2 wherein said brake surfaces extend radially beyond the circumferential edge portion of the turntable and the brake calliper is mounted on the support means outwardly of the brake surfaces and said cover member is fixed to the circumferential edge portion of the turntable and extends radially outwardly therefrom to overlie the brake surfaces and the brake calliper.

4. The invention of claim 3 wherein said cover member has a depending outer portion that surrounds the brake calliper so as to encompass and enclose the same in an outwardly radial spaced manner.

5. The invention of claim 1 wherein said last named means includes said brake member being disposed below and under the turntable and spaced vertically therefrom and having an inner edge portion defining the brake surfaces and the brake calliper being mounted on the support means under the turntable.

6. The invention of claim 5 including vertical spacer means connecting the brake member to the underside of the turntable.

7. A coupling means for connecting a tractor vehicle to an articulated trailer so as to prevent jack-knifing of the trailer comprising, a. a support member fixedly mounted on the rear of the tractor vehicle;
b. a bearing support ring fixedly mounted on the support member;
c. a bearing member mounted on the support ring;
d. a turntable rotatably mounted on the bearing member for rotation about a substantially vertical axis intersecting the longitudinal center line of the vehicle and radially and horizontally supported thereby for free rotation relative to the support member;
e. means for preventing axial movement of the turntable relative to the support ring;
f. a brake member carried by the turntable and disposed therebelow and rotatable therewith and having opposing horizontal parallel faces defining brake surfaces;
g. at least one brake calliper mounted on the support member to be restrained from movement about the vertical axis of the turntable and positioned for operative engagement with said brake surfaces at all articulated positions of the trailer relative to the tractor vehicle whereby upon actuation of the brake calliper articulation of the trailer relative to the tractor vehicle is prevented;
h. means for connecting a trailer to the turntable so that it is fast therewith; and,
i. means for protectively covering the brake surfaces and the brake calliper so that they are not exposed to rain and the like elements and are kept clean and dry whereby any possible slippage therebetween when the brake calliper is actuated to grip the brake surfaces is prevented.

8. The invention of claim 7 wherein the bearing member is a ring of L-shaped cross-section having a horizontal portion seated on the supported ring and on which the turntable is horizontally supported and having a vertical portion on which the turntable is radially supported.

9. The invention of claim 8 wherein said means for preventing axial movement of the turntable includes an overlapping arrangement between the bearing support ring and means carried by the turntable.

10. The invention of claim 9 wherein said last means is composed of the inner edge portion of the brake member.

* * * * *